Figure 1:
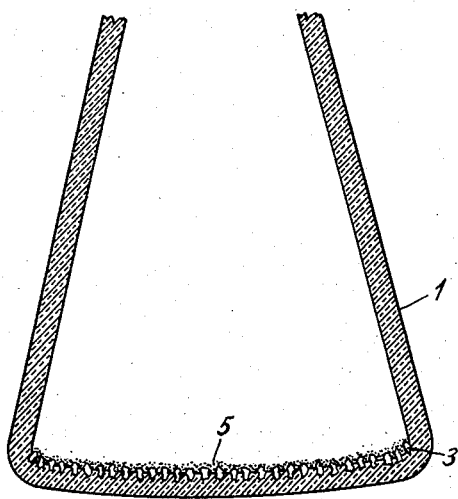

Nov. 15, 1938.   A. SCHLEEDE ET AL   2,137,118

FLUORESCENT SCREEN

Filed Dec. 6, 1934

INVENTOR
ARTHUR SCHLEEDE
FRITZ SCHROTER
BY
ATTORNEY

Patented Nov. 15, 1938

2,137,118

UNITED STATES PATENT OFFICE 2,137,118

FLUORESCENT SCREEN

Arthur Schleede and Fritz Schroter, Berlin, Germany, assignors to Telefunken Gesellschaft für Drahtlose Telegraphie m. b. H., Berlin, Germany, a corporation of Germany Application December 6, 1934, Serial No. 756,289
In Germany December 19, 1933

3 Claims. (Cl. 250—164)

The present invention relates, in general, to electron tubes principally of the cathode ray type having a fluorescent screen provided with a rough or granular support or substratum.

The Braun or cathode ray tube is a most important implement in the observation and the recording of rapidly variable actions and finds wide application in television and oscilloscope observations. The observable effect is insured in the Braun tube by the fact that a cathode ray pencil developed within the tube causes fluorescence at its point of impact upon the end wall of the tube. By electrostatic or electromagnetic control of the developed cathode ray pencil a variation in the position of the fluorescent spot is occasioned so that the time change of the action is rendered visible. When the Braun tube is employed in television work, for example, the electro-optical image or picture is directly recreated upon the fluorescent screen of the tube. In the Braun tube used in television apparatus the point is, therefore, to have available a fluorescent screen of excellent quality not only insofar as a favorable transformation factor or efficiency of changing electrical energy into luminous energy is concerned, but above all as regards uniform feebly translucent structure of the screen.

The production of fluorescent screens in the Braun tube as known to the expert is attended with rather serious difficulties. Fluorescent glasses possessing an adequate transformation factor or efficiency which could be used or sealed directly into the tube are, so far as is known today, non-existent. On the contrary, one has to rely upon crystallized pulverulent luminophorous or luminescent substances such as calcium or cadmium tungstate, zinc silicate, zinc sulfide, zinc-cadmium sulfide, etc. Among these the former two may be secured by sintering on the glass wall without the luminescence or fluorescence being incidentally impaired. However, in the case of sulfide fluorescent materials the sintering method is unserviceable inasmuch as the luminosity suffers a reduction and the color of the fluorescent light a change. In this case drying or meltable bonding or cementing means must be employed. When using these methods it is difficult to prevent the grains or particles of the fluorescent material from becoming enveloped, and this is conducive to a screening action in reference to the electrons. In order to overcome this difficulty an attempt has been made to avoid the use of any bonding agent by imparting to the supporting or substratum of the screen, e. g., the glass wall a suitably rough or granulated structure. All that will then be necessary is to feebly and gently rub the pulverulent fluorescent substance into the rough surface and to thereupon remove surplus material by tapping. For producing such roughened structure, it has been suggested to use a sandblast, though it was found that the pits thus produced are mostly too shallow in order that the substance may be held and retained with sufficient firmness. The same situation holds good, a fortiori, relative to chemical caustics used for causing a granulated surface condition.

Figure 2:
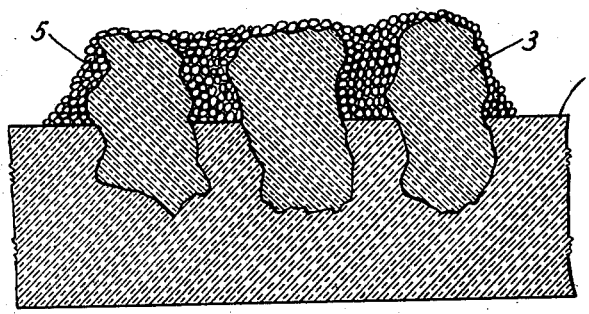

According to the present invention, it has been found that another mode to result in a rough surface obviates these difficulties. The accompanying drawing illustrative of applicants' invention, comprises two figures, of which Fig. 1 shows one embodiment of a fluorescent screen according to applicants' invention; and Fig. 2 shows an enlarged view of the screen structure. There is introduced in the bulb or tube a powder having a melting point higher than the glass of the bulb, but capable of fusing fast onto the glass wall; next the bulb is heated until a thin layer of the powder confined therein has been sintered fast, and finally the excess of powder is poured and blasted out. Suitable for this purpose are all silicates (especially pulverulent glass) melting more difficultly than glass but also a good many other substances are suited, more particularly calcium and cadmium tungstate and zinc silicate mentioned at the outset. When using the latter fluorescent materials this advantage is obtained that the fluorescent light of the fluorescent material that has been rubbed in is complemented by that of the supporting fluorescent material or materials and may be advantageously influenced in its hues. Incidentally there may be produced also secondary mutual excitations of light of a definite spectral composition. Similar coloration effects are obtainable by the use of fluorescent or dyed glasses acting as roughening or granulating means. More particularly, it is possible by the use of fluorescent or dyed supports to insure a color resembling more closely white light so that the television picture comes to look more closely like a normal photograph. By employing suitable colored glasses it will finally be feasible to insure a reduction in the stray-light zone in that the components of radiation of the substances reaching the outside over circuitous paths are markedly absorbed.

Having thus described our invention what is claimed and desired to secure by Letters Patent is:

1. A tube envelope having a predetermined melting point, a sintered vitreous substratum thereon, said substratum having a higher melting point than the predetermined melting point of the tube envelope, and a layer of powdered fluorescent material on said substratum.

2. A tube envelope having a predetermined melting point, a sintered substratum of vitreous particles partially embedded in said envelope, said particles having a higher melting point than the melting point of the tube envelope, and a layer of fluorescent material coating only the exposed portion of said partially embedded particles.

3. A tube envelope having a predetermined melting point, a sintered substratum of fluorescent glass particles partially embedded in the tube envelope, said fluorescent glass particles having a higher melting point than the melting point of the tube envelope, and a layer of fluorescent material coating only the exposed portion of said partially embedded particles.

ARTHUR SCHLEEDE.
FRITZ SCHROTER.